United States Patent [19]

Hedman et al.

[11] 4,450,830

[45] May 29, 1984

[54] SOLAR HEAT DEVICE

[76] Inventors: Rolf E. Hedman; Gunnar Hedman, both of Lofsbergsvagen 36, S-582 69 Linkoping, Sweden

[21] Appl. No.: 255,969

[22] Filed: Apr. 20, 1981

[51] Int. Cl.³ .............................................. F24J 3/02
[52] U.S. Cl. .................................. 126/450; 126/447; 126/449
[58] Field of Search ............... 126/442, 446, 447, 448, 126/449, 450; 165/168, 171, 181

[56] References Cited

U.S. PATENT DOCUMENTS

| | | | |
|---|---|---|---|
| 4,011,856 | 3/1977 | Gallagher | 126/448 |
| 4,094,301 | 6/1978 | Sorenson et al. | 126/450 |
| 4,150,660 | 4/1979 | Peters et al. | 126/450 |
| 4,197,833 | 4/1980 | Pelish | 126/450 X |
| 4,207,869 | 6/1980 | Hart | 126/450 |
| 4,241,727 | 12/1980 | Toti | 126/446 |
| 4,246,892 | 1/1981 | Waiche | 126/446 X |
| 4,252,103 | 2/1981 | Carter et al. | 126/450 |
| 4,313,430 | 2/1982 | Britner et al. | 126/446 |
| 4,340,034 | 7/1982 | Hopper | 126/446 X |

FOREIGN PATENT DOCUMENTS

| | | |
|---|---|---|
| 1541577 | 3/1979 | United Kingdom . |
| 2009918A | 6/1979 | United Kingdom ................ 126/450 |
| 2017855A | 10/1979 | United Kingdom ................ 126/450 |

Primary Examiner—Samuel Scott
Assistant Examiner—Margaret A. Focarino
Attorney, Agent, or Firm—William A. Drucker

[57] ABSTRACT

Solar heat device to transfer heat energy from the sun to a fluid, comprising a frame (1) including an isolated bottom (2), heat absorbing wafers (5) having tubes (4) for the fluid, and a glass sheet (6) on the top surface of the solar heat device.

The frame (1) comprises two portions, one of which has a groove (10) provided with a rubber hose (16) located therein to seal the glass sheet (6) between the two portions. The heat absorbing wafer, of the solar heat device has a wave shape increasing from the central tube (4) receiving part thereof and outwardly towards the free edge thereof.

6 Claims, 5 Drawing Figures

SOLAR HEAT DEVICE

The present invention relates to a solar heat device to transfer heat energy from the sun to a fluid, preferably water, and said solar heat device comprises a frame having an isolated bottom, a number of tubes for the fluid, said tubes being provided with heat absorbing wafers and a sheet of glass on top of the solar heat device.

Solar heat devices of the kind disclosed are previously known, but due to the great temperature differences, existing in solar heat devices problems, arise due to the heat expansion, especially when using larger devices. One of the resulting problems may be that the protecting sheet of glass, in case of a non-yieldable mounting, may break at high temperatures due to the expansion thereof, and another problem is that the heat absorbing wafers connected to the tubes for the fluid from said attachement to the tubes, and also, in some cases such a great uncontrolled bent out action of the wafer may take place, that the glass located there above will be brought into contact with the wafer and thereby burst.

These and other disadvantages inherent in previously known solar heat devices are eliminated in that the solar heat device according to the present invention has the characteristics disclosed in the following claims.

The invention will be described with reference to the accompanying drawing, showing an exemplyfing embodiment of the invention.

Figure 1:
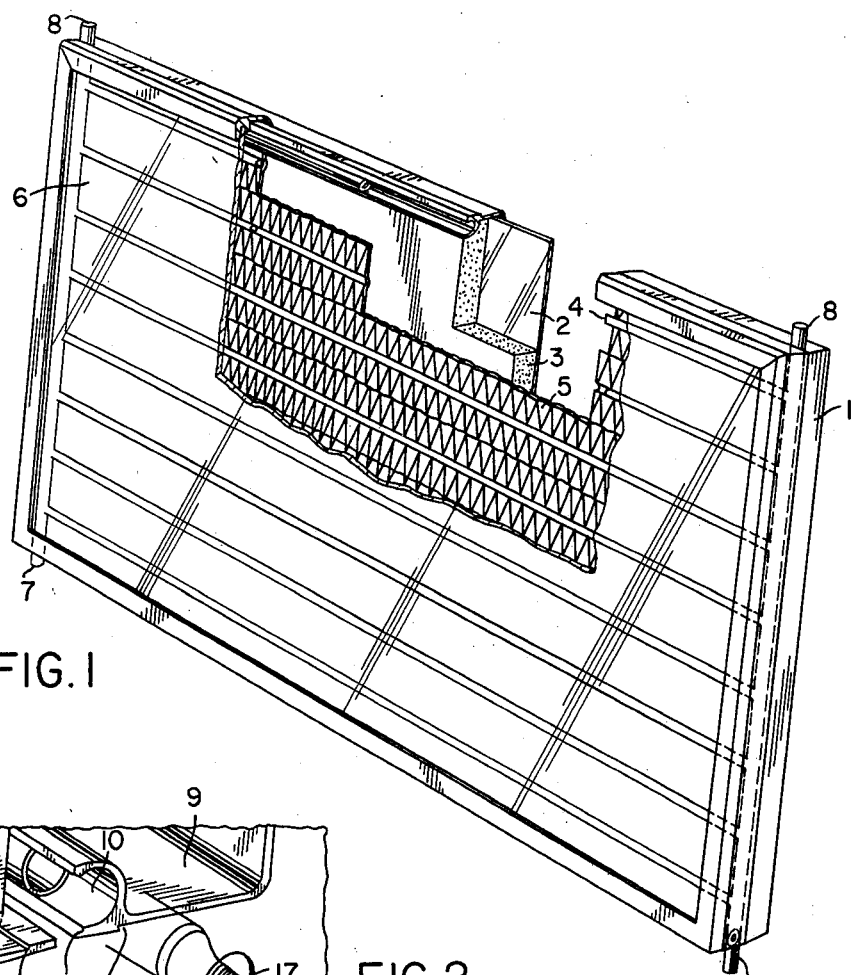
FIG. 1 is a partially fragmentaric perspective view of a solar heat device according to the invention.

Reference numeral 1 denotes the frame, defining the stand of the solar heat device and the bottom 2 thereof, which may be made from aluminium or some other suitable material. An isolating board 3 of mineral wool, a cellular plastic material or some other suitably isolating material, and the tubes 4 having the heat absorbing wafers 5 are located on top of said isolation board in order to protect the wafers and increase the efficiency and the heat absorbing capacity of the solar heat device, additionally, a sheet of glass 6 is attached to the frame in a manner to be more fully described below. Inlet and outlet pipes 7 and 8, respectively, are provided for the water or corresponding fluid.

Figure 2:
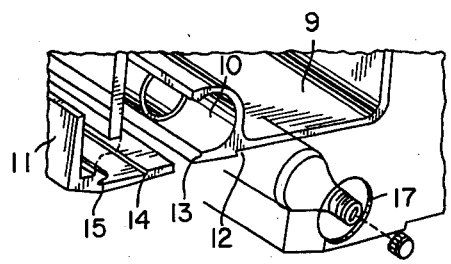
FIGS. 2–4 illustrate some detail on a larger scale.
Figure 3:
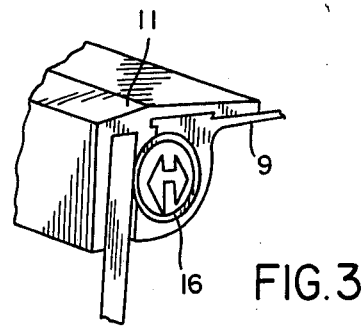

FIG. 2 illustrates more in detail the structure of the frame 1. The frame 1 comprises two portions of an extruded aluminium material and one of the main portions 9 is provided with a groove 10 substantially having a section as a part of a circular shape, and the other portion 11 being substantially shaped as an L and so formed, that it may be secured by snapping upon the main portion 9 in order to hold the sheet of glass 6. To this end, a protruding edge 12 and a flange 13 are provided in the main portion 9 and a corresponding recess 14 and a furrow 15 are provided in L-shaped portion 11, as may be seen from FIG. 2, whereby the portions 9 and 11 in the engaging condition are mounted as may be seen in FIGS. 3 and 4.

A rubber hose 16 is inserted into the groove 10 and should be made from a dense and weather resistance rubber material.

The hose 16 extends along the whole periphery of the solar heat device and, is provided with a vent 17 in one end thereof 17, said vent is of the same type as in a motor car tire.

Figure 4:
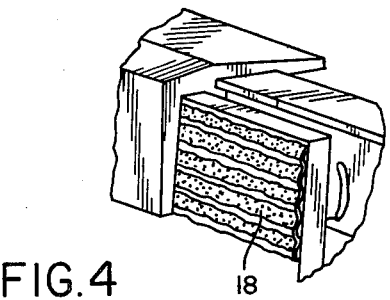

FIG. 4 illustrates how the sheet of glass 6 is attached to the frame 1, and in order to obtain the required sealing action against the L-shaped portion 11, some sort of sealant 18 is applied such as a silicone rubber or similar material onto the portion of the glass sheet engaging the L-shaped profile.

Figure 5:
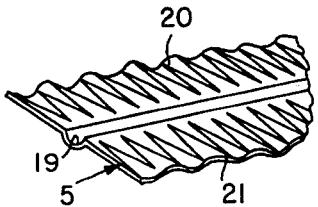
FIG. 5 is a perspective view of some of the heat absorbing wafers.

FIG. 5 in further detail illustrates a wafer included in the solar heat device. The wafer comprises an elongated steel sheet profile means, which centrally has a recess 19 matching the shape of the tubes 4, and the tubes are to be connected to the wafer 5 by means of welding or the like.

The heat absorbing surfaces 20 of the wafer are so shaped that a wave shape extends from the recess 19 and increases outwardly towards the free edge 21 of the wafer, i e the sheet metal of the wafer is so pressed that a wave shape is obtained which has a relatively large "wave length" in the outermost position by the free edge 21, and said shape decreases inwardly towards the recess 19 to finally completely cease in close connection to the recess 19.

This results in that by a high temperature of the wafer 5 a controlled bending action occurs, uniformly distributed along the total length of the wafer and thereby the bending out of the wafer may not in any position be so great that it is brought into engagement with the sheet of glass 6 to break the same and, similarly, the risk for breakage of the wafer is not as great as it would have been in case the wafer had been allowed to bend in an uncontrolled manner. By virtue of the wave shape, the wafers also exhibit larger heat absorbing surfaces.

When mounting the sheet of glass 6 into the frame 1, the sheet of glass is put on top of the main portion 9 and the rubber hose 16 is already located in the groove 10 thereof and there after, the sheet of glass is provided with a string of a sealant 18 and the L-shaped portion 11 is snapped into place against the main portion 9. When this moment is accomplished, the rubber hose 16 is filled with air to a suitable pressure. The pressure should be so selected, that the glass is raised and sealed against the rubber hose 16 and also against the L-shaped portion 11. The mounting of the remaining details is accomplished before the mounting of the glass in the conventional manner and it should only be noted that the main portion 9 of the frame may be provided with attachment lugs to secure the wafers by means of screws or rivets, or these may be secured in some other suitable manner.

Naturally, the invention is not limited to the embodiment described above and illustrated in the drawing, but may be modified in various ways within the scope of the following claims without departing from the spirit of the invention.

It may be mentioned, as an example of such a modification, that the hose 16 may be divided into several sections, and thereby additional vents are required, and, in case such a step seems necessary, diagonally placed stays may be riveted in a suitable manner in the frame to strengthen and stabilize the solar heat device.

We claim:

1. A solar heat device to transfer heat energy from the sun to a fluid, preferably water, said solar heat device comprising a frame having an isolated bottom attached thereto, plural heat absorbing wafers having tubes for the fluid, and a sheet of glass disposed on top of the solar heat device, the frame comprising two portions, one said portion having a groove and the other portion having a substantially L-shaped profile, the one said portion and the other portion being arranged to be mounted to each other by means of a snapping mechanism, comprising a protruding edge and a flange of the one said portion as well as a corresponding recess and a furrows of the other L-shaped portion.

2. Device according to claim 1, characterized by the fact that a rubber hose is provided in the groove to be pressurized to the desired pressure in order to seal against the sheet of glass engaging the L-shaped portion.

3. Device according to claim 2, characterized in that the rubber hose is provided with a vent to permit pressurizing to a suitable pressure level.

4. Device according to claim 2, characterized by the fact that the rubber hose is divided into several sections, whereby each section has a vent means.

5. Device according to claim 4, characterized by the fact that each wafer is provided with a centrally located recess, and said recess matches the shape of the tubes.

6. Device according to claim 5, characterized by the fact that said wafers each have a free edge, the heat absorbing surfaces of the wafers are so designed that a wave shape is obtained increasing from the recess and outwardly towards the free edge of the wafer.

* * * * *